United States Patent
Maki et al.

[11] 3,872,357
[45] Mar. 18, 1975

[54] LINEAR SYNCHRONOUS MOTOR FOR HIGH-SPEED VEHICLES

[75] Inventors: Naoki Maki, Ibaraki; Hironori Okuda; Sadaharu Kawai; Tamotsu Tatsumi, all of Hitachi, Japan

[73] Assignee: Hitachi, Ltd., Tokyo, Japan

[22] Filed: May 4, 1973

[21] Appl. No.: 357,117

[30] Foreign Application Priority Data
May 8, 1972  Japan.................................. 47-45208

[52] U.S. Cl............... 318/135, 310/13, 104/148 LM
[51] Int. Cl. ........................................... H02k 41/02
[58] Field of Search ................ 310/12, 13; 318/135; 104/148 LM;148 MS

[56] References Cited
UNITED STATES PATENTS 3,679,952  7/1972  Pelenc ..................... 310/13 X
3,721,874  3/1973  Pelenc et al. ..................... 310/12 X
3,771,033  11/1973  Matsui et al. ..................... 310/13 X

*Primary Examiner*—Gerald Goldberg
*Attorney, Agent, or Firm*—Craig & Antonelli

[57] ABSTRACT

A linear synchronous motor used for the dual purpose of propulsion and levitation or stabilization of a high-speed vehicle, characterized in that field coils of the linear synchronous motor are mounted on the vehicle, the leading angle of armature coils on the ground at the time of starting current flow therein being maintained within a predetermined range which is variable, said armature coils consisting of distributed windings, the pitch of the field coils being shorter than that of the pole pitch, and the armature coils are wound in a single layer at the pitch of 120°.

6 Claims, 15 Drawing Figures

FIELD COILS
ARMATURE COILS (a) FOR LEADING ANGLE $\gamma$ OF 60°

(b) FOR LEADING ANGLE $\gamma$ OF 90°

(c) FOR LEADING ANGLE $\gamma$ OF 120°

FIG. 7

ARMATURE COILS

FIG. 8

ARMATURE COILS

FIG. 9

(PROPULSIVE FORCE)         (LEVITATIVE FORCE)

(1) WHEN $\gamma \leq (180° - m)$ (2) WHEN $(180° - m) \leq \gamma \leq 180°$ (3) WHEN $180° \leq \gamma \leq (360° - m)$ (4) WHEN $(360° - m) \leq \gamma$

FIG. 10

(PROPULSIVE FORCE)     (LEVITATIVE FORCE)

(1) WHEN $\gamma \leq (\frac{360°}{n} - m)$

(2) WHEN $(\frac{360°}{n} - m) \leq \gamma \leq \frac{360°}{n}$ (3) WHEN $\frac{360°}{n} \leq \gamma \leq (\frac{360°}{n} - m + 180°)$ (4) WHEN $(\frac{360°}{n} - m + 180°) \leq \gamma$

LINEAR SYNCHRONOUS MOTOR FOR HIGH-SPEED VEHICLES

The present invention relates to a commutatorless synchronous motor used for the dual purpose of propulsion and levitation or stabilization of a high-speed vehicle.

An ultrahigh speed vehicle is under development which runs at the speed of 300 km/h or more and which is driven by a linear motor comprising field coils including superconductor materials mounted on the vehicle and corresponding shortcircuiting coils or conductor sheets laid on the ground opposedly to the field coils, so that the vehicle is levitated magnetically by the electromagnetic repulsive force generated between the field coils and the shortcircuiting coils and directly driven linearly in the absence of any adhesive force. In such a linear motor, however, different means are used for propulsion, levitation and stabilization of the vehicle, which requires a great amount of coils to be arranged on the vehicle and the ground, resulting in a high cost of the construction of the vehicle system.

It is therefore desirable to develop an economical device which permits the same coils to effect both propulsion and levitation at the same time. Some of the suggested devices to meet such requirements will be mentioned below.

One of such devices is so constructed that the field coils mounted on both sides of the vehicle "sandwich" the armature coils mounted on the central portion of the track on the ground, and that the levitative force is derived from the product of the field magnetic fluxes and DC current flowing in those portions of the coils in the direction of travel of the vehicle, and the propulsive force is obtained from the product of the field magnetic fluxes and the DC current flowing in those portions of the coils perpendicular to the direction of travel of the vehicle. This system, called a DC linear motor characterized by less pulsation of the levitative force for more stable levitation, has the disadvantages of smaller propulsive force and higher cost due to complicated means required for switching current in the armature coils during the running of the vehicle.

In another one of the suggested devices, armature coils are laid on the ground corresponding to the field coils mounted on the vehicle in such a manner that three armature coils are inserted at 60° pitch for each field coil thereby to achieve a six-phase system. The vehicle according to this system is propelled and levitated on the same principle as the preceding device by the force obtained by appropriately switching the current flowing in the armature coils. Even though the short length of the armature coils employed in this system facilitates the production thereof, more thyristors for each couple of field coils are required for switching the current in the main power supply circuit, leading to the disadvantages of less levitative force and larger pulsations thereof.

In view of the above-mentioned disadvantages of the conventional systems, an object of the present invention is to provide a linear synchronous motor for high-speed vehicles which have sufficient propulsive force as well as stable levitative force. To achieve the above-mentioned object, the present invention is characterized in that the relation between the field magnetic coils mounted on the vehicle and the corresponding armature coils is determined to satisfy the inequality $$(180°/x - m/2 + u/2) < \gamma < (180° + 180°/x - m/2 + u/2)$$

where $m$ is the length of one side of the armature coils in the direction of travel of the vehicle which comprise an appropriate number of windings, $\gamma$ the leading angle of the armature coils at the time of starting current flow, and $u$ an overlapping angle. In this inequality, $x$ is 2 where the method of full wave control of the armature coil current is employed, and $x$ is $n$ ($n$ being the number of phases of the armature coils) where the half-wave control is used therefor. Also, according to the invention, the leading angle $\gamma$ is made variable to obtain both positive and negative propulsive forces as well as levitative or stabilization force, the armature coils take the form of distributed windings, the pitch of the field magnetic coils is made smaller than the pole pitch, and the armature coils comprise a single layer of winding at 120° pitch.

The above and other objects features and advantages will be made apparent from the detailed description taken in conjunction with the accompanying drawings, in which:

Figure 1:
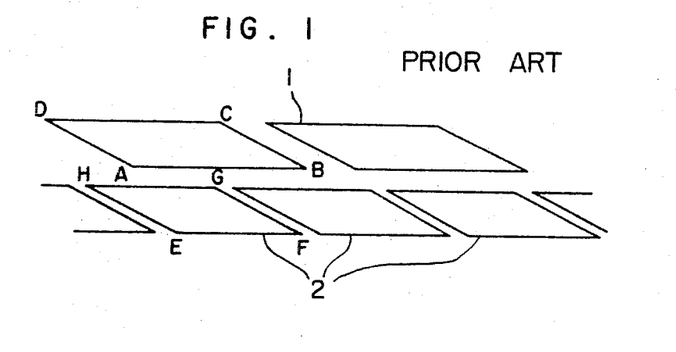
FIG. 1 is a diagram for explaining the spatial relation between the field coils and the armature coils.
Figure 2:
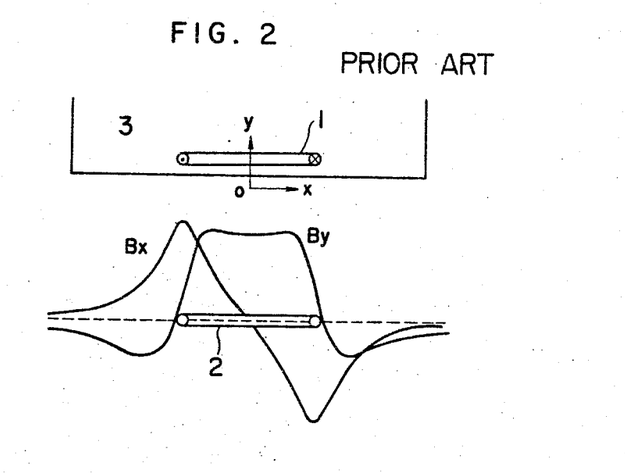
FIG. 2 is a diagram for explaining the magnetic fluxes generated by the field coils.

The diagram of FIG. 1 is shown for explaining the relation between the field coils 1 comprising superconductive materials mounted on the vehicle and the plurality of corresponding armature coils 2 aligned on the ground in the direction of travel of the vehicle. The diagram of FIG. 2 shows the magnetic fluxes density on the armature coils 2 as they are affected by the field coils 1 mounted on the vehicle 3. In view of the fact that the length of the field coils is sufficiently large as compared with the width thereof, the magnetic flux density Bx and By on the surface of armature coils 2 in the transverse direction (x) and in the vertical direction (y) respectively, are expressed as shown below, assuming that the field coils are infinite in their length.

$$By = \mu_o I_{fl} 2x \ \ x - a/(x-a)^2 + g^2 - x + a/(x+a)^2 + g^2 \tag{1}$$

$$Bx = \mu_o I_{fl} 2x \ \ g/(x-a)^2 + g^2 - g/(x+a)^2 + g^2 \tag{2}$$

where $\mu_o$ is magnetic permeability in the air, $2a$ the width of the field coils, $g$ the average gap between the field coils and armature coils, $I_f$ the magnetomotive force of the field coils, and $x$ the distance from the central point of the field coils in the transverse direction.

Let us consider the interaction between field coil ABCD and armature coil EFGH in FIG. 1. According to Fleming's left-hand rule, the force of levitation of the vehicle is derived from the repulsive force $K_1 Bx Ia$ ($K_1$ being a positional function) that is the product of the magnetic flux density $Bx$ in the transverse direction and the armature current $Ia$ flowing in the portions FE and HG of the armature coils in the direction of travel of the vehicle. In like manner, propulsive force for the vehicle is obtained from the product of magnetic fluxes density $By$ in the vertical direction generated by the field coil ABCD and the armature current $Ia$ flowing in the portions GF and EH of the armature coils perpendicular to the direction of travel of vehicle, that is, $K_2 By Ia$, $K_2$ being a positional function.

The operating principle mentioned above contributes to the realization of a linear synchronous motor having means capable of achieving the dual purpose of propulsion and levitation at the same time by appropriately switching the armature current in accordance with the position of the field coils. In such a system, the magnitude of propulsive and levitative forces and the pulsation of the levitative force depend to a large measure on the number of phases of the armature coils, pitch thereof, the switching of excitation of the armature coils, i.e., the leading angle and the period of energization, and the overlapping angle thereof.

Figure 3:
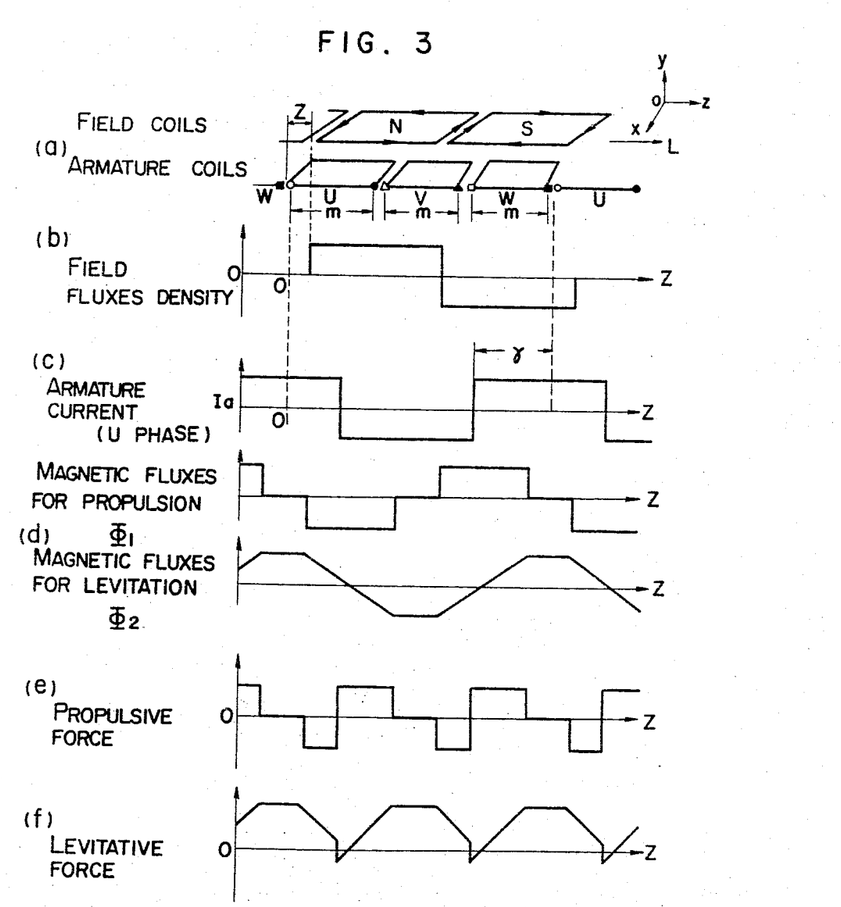
FIGS. 3 and 4 are diagrams for explaining the operation of the linear synchronous motor for high-speed vehicles of the full-wave control type according to an embodiment of the invention.

Referring to FIG. 3 showing the diagram for explaining the operation of the linear synchronous motor for high-speed vehicles according to an embodiment of the invention, symbol ($a$) illustrates the positional relation between the field coils and the armature coils, in which the field coils comprise two poles N and S, while the three-phase armature coils of single-layer imaginary winding are arranged at the pitch of 120°. The actual length of the armature coils, however, is slightly less than 120° pitch actually as the result of need to provide for the thickness of the coils and gaps between therebetween. Also, armature coils of double-layer ordinary winding instead of the single-layer winding may be employed. Letter Z indicates the distance between one of the armature coil and a corresponding field coil measured in the direction of vehicle travel as shown an arrow L. The field flux density generated by the above-mentioned arrangement is distributed in a substantially rectangular form as shown in FIG. 3(b). In switiching current $Ia$ flowing in the U phase armature coils as shown in FIG. 3(c) by the full-wave control method (which will be described later), magnetic fluxes $\Phi_1$ resulting from the crossing of the portions of armature coils perpendicular to the direction L of travel of the vehicle and the density $By$ of field magnetic fluxes and magnetic fluxes $\Phi_2$ resulting from the crossing of the longitudinal portions of the armature coils and the density $Bx$ of field magnetic fluxes are as illustrated in FIG. 3(d), from which propulsive force and levitative force are obtained respectively in the waveforms as shown in FIGS. 3(e) and 3(f) respectively.

As will be apparent from these drawings, even though the waveform shown as representing the propulsive force includes a little element of braking force, it generally consititutes the propulsive force in the direction L of vehicle travel, while on the other hand the waveform shown as representing the levitative force makes up the real levitative force substantially in its entirety. In view of the general requirement that levitative force be larger than propulsive force for a high-speed vehicle, the shown relation between the two forces presents no problem.

Figure 4:
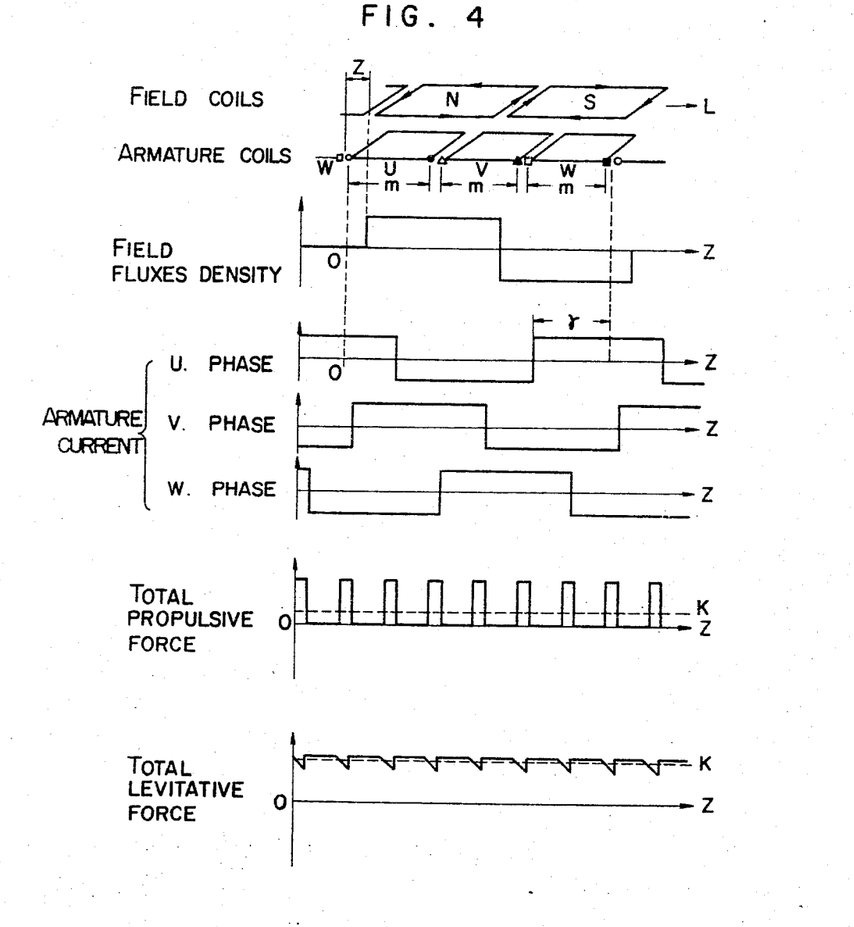

Waveforms representing the total propulsive and levitative forces derived from the three phases of coil arrangement shown in FIG. 3 are illustrated in FIG. 4. As can be easily seen from them, the whole waveform shown as representing the propulsive force is applied in the direction L of travel of the vehicle, while the levitative force is very stable incorporating a very small amount of pulsation. K denotes the average level of forces in the drawings.

Figure 5:
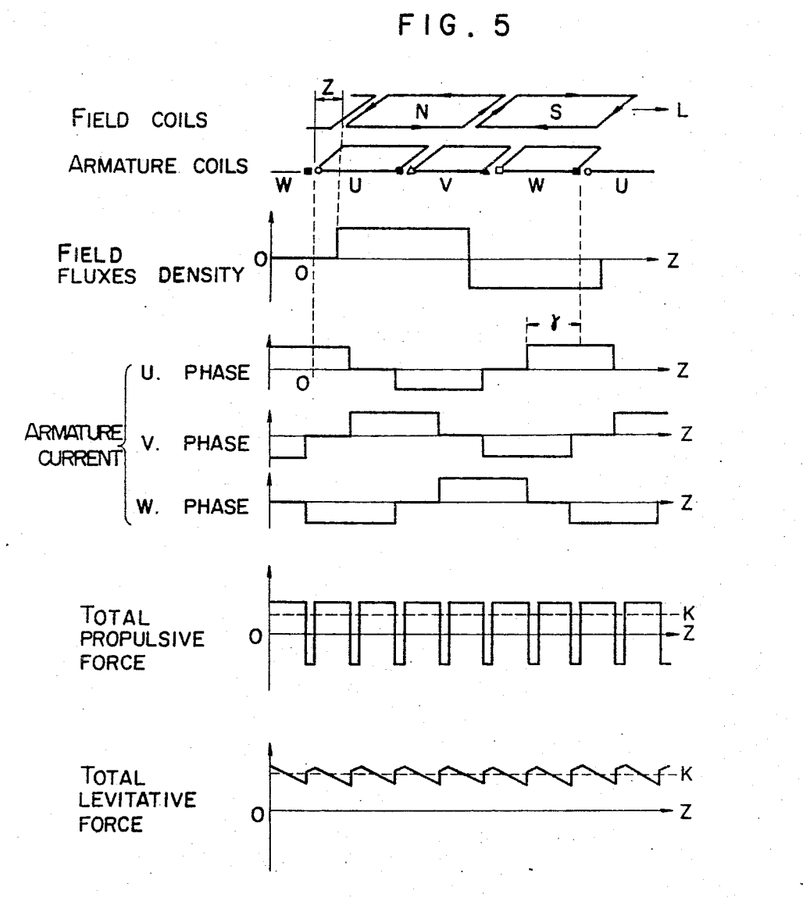
FIG. 5 is a diagram for explaining the operation of the linear synchronous motor for high-speed vehicles of the half-wave control type according to an embodiment of the invention.

Referring to FIG. 5 which is a diagram similar to FIG. 4 for explaining the half-wave control of current in the armature coils with the leading angle $\gamma$, 700, a part of the shown propulsive force is accompanied by braking force, while total levitative force is as stable as the one shown in FIG. 4. This system permits the great reduction of the number of thyristors for switching the current in each of the armature coils as compared with the full-wave control system.

Figure 6:
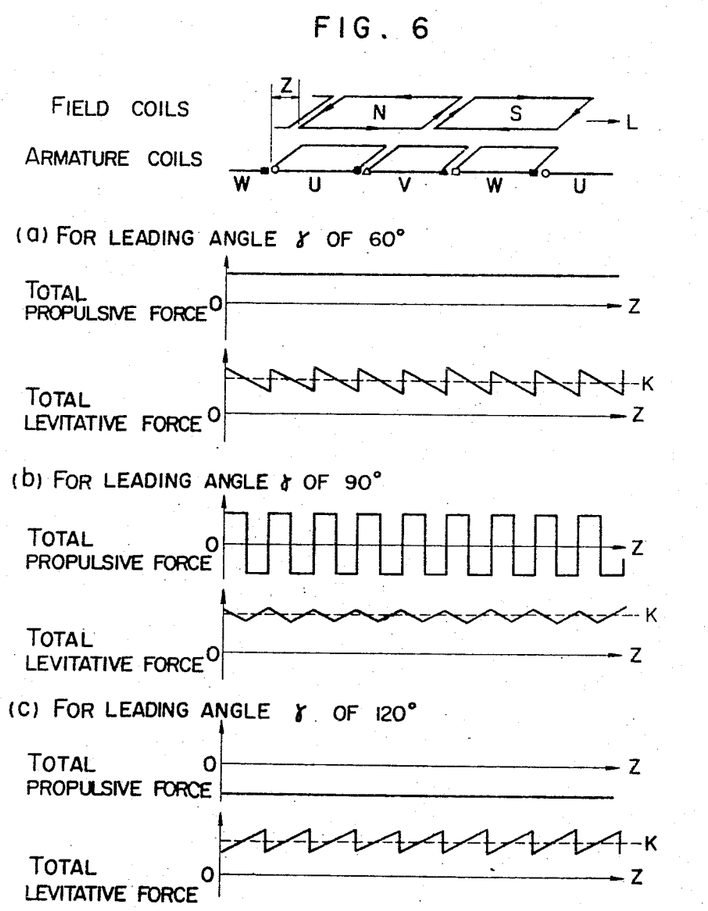
FIG. 6 is a diagram for explaining the operation of the linear synchronous motor of FIG. 5 with its leading angle at 60°, 90° and 120° respectively.

The diagram of FIG. 6 is shown for explaining the waveforms of the total propulsive force and the total levitative force derived from the half-wave control system in which the leading angle $\gamma$ at the time of starting current flow in the armature coils is set at the electrical angles of 60°, 90° respectively. It will be seen from the drawing that the total propulsive force is capable of being varied between positive propulsive force in the direction of travel of the vehicle and the braking force in the reverse direction, while maintaining the total levitative force substantially constant. In this case, the ripple factor of the levitative force is one-third to one-seventh as compared with the variation of levitative force in changing the angle of lead at the possible variation range therof which is as small as one-thirteenth.

It is apparent from the above explanation that it is possible, by making the leading angle $\gamma$ variable, to produce variable positive and negative propulsive forces while maintaining the levitative force constant. It is thus obvious that the control of the operation of a high-speed vehicle can be effected by controlling the leading angle $\gamma$.

Figure 7:
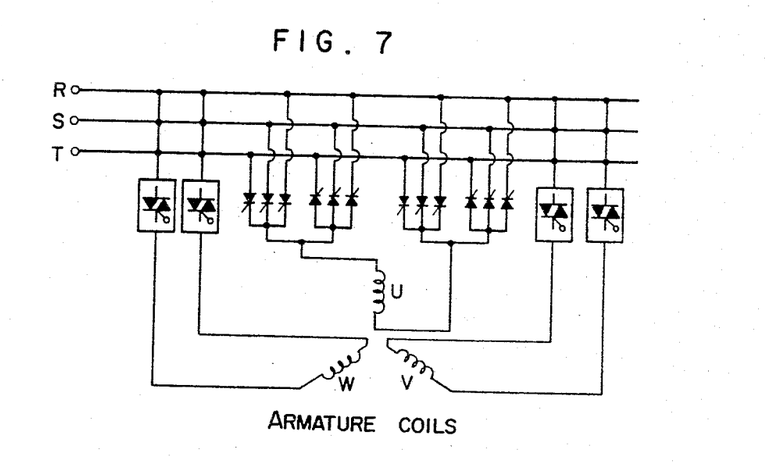
FIGS. 7 and 8 are circuit diagrams for explaining the full-wave control and half-wave control systems.
Figure 8:
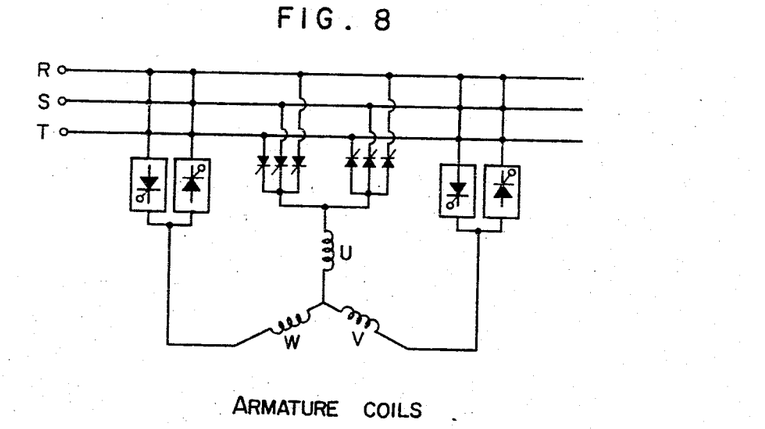

The diagrams of FIG. 7 and 8 are shown for the purpose of explaining the full-wave and half-wave control systems in which current flowing in the armature coils is controlled by switching the same. In the full-wave control system, positive and negative power supplies are connected to each armature coil whereby current flows separately in each of the armature coils. As a result, 12 thyristors for each phase, that is to say, 36 thyristors for three phases are required.

In the half-wave control system illustrated in FIG. 5, by contrast, the ends of the armature coils are connected with each other, so that current flows only in two of the three phases under normal conditions. For example, the thyristors are so controlled that current flowing into the armture coil of U phase flows out at the armature coil of V phase. In such an arrangement, it is required to provide only six thyristors for each phase, that is to say, 18 thyristors for three phases, that is half the number of thyristors required in the full-wave control system, making possible a very low-cost construction of the linear motor.

Study will be made now of a case in which armature coils of a given number of phases, given length of coils, given amount of the leading angle and given system for controlling the armature current are used.

Figure 9:
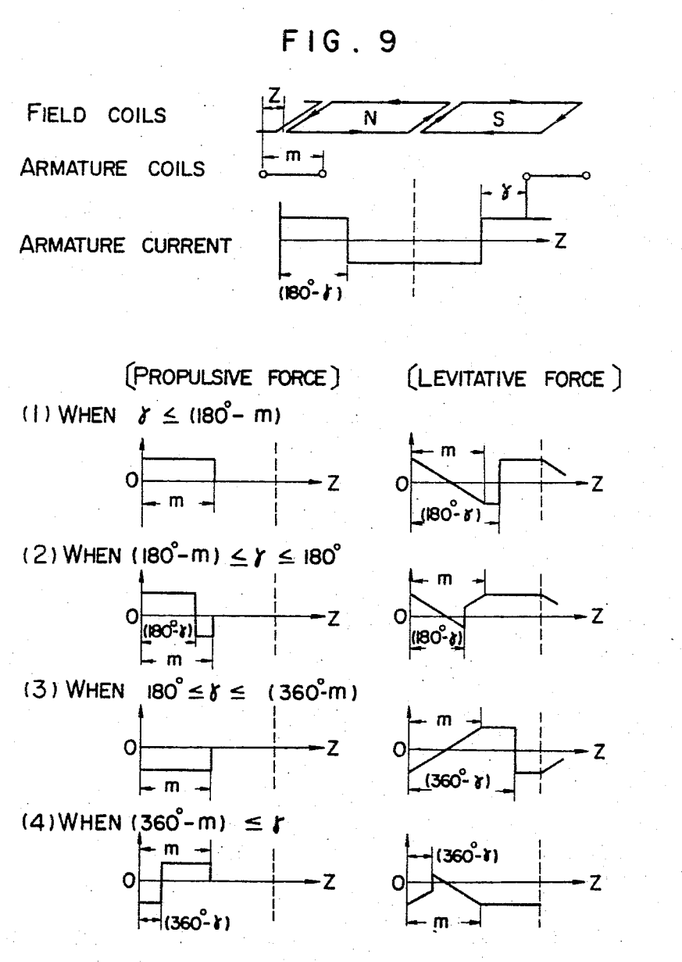
FIGS. 9 and 10 are diagrams for explaining the propulsive and levitative forces when the full-wave and half-wave control systems are employed respectively.

With reference to FIG. 9, waveforms of propulsive force and levitative force are shown which are generated in an armature coil of a phase with the length of $m$, number of phases $n$ and the leading angle $\gamma$ under the full-wave control system. It will be seen that by varying the leading angle $\gamma$, a given desired amount of positive or negative propulsive force and levitative force are generated. It is also apparent from the drawing that $$\gamma_1 = 90° - m/2, \text{ and } \gamma_2 = 270° - m/2$$

where $\gamma_1$ and $\gamma_2$ are the average leading angle at which the levitative force is reduced to zero. Therefore, when $$90° - m/2 < \gamma < 270° - m/2 \quad (3),$$

a levitative force is obtained with the propulsive force so variable over positive and negative ranges that it becomes zero when $\gamma = 180° - m/2$. In this way, by appropriately selecting the leading angle $\gamma$, it is possible to obtain both levitative force and propulsive force at the same time.

Figure 10:
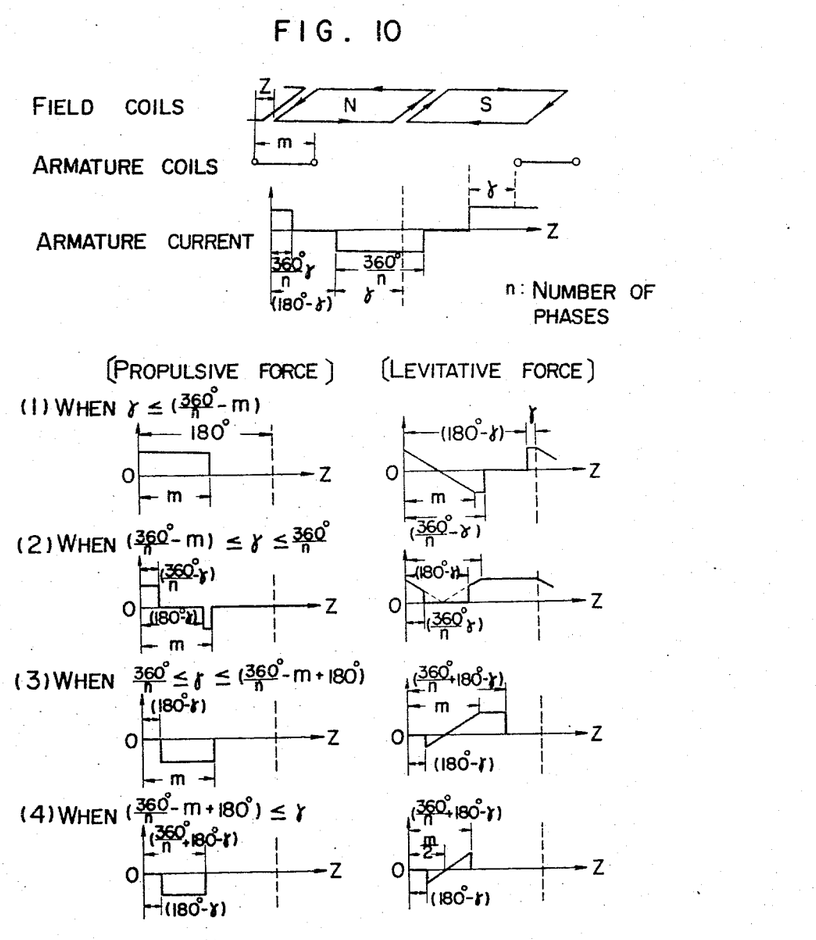

Referring to FIG. 10, waveforms are shown representing propulsive and levitative forces generated in a coil of a phase as the leading angle $\gamma$ is varied in the half-wave control system with the coil length and number of phases of the armature coils set at $m$ and $n$ respectively. In this case, unlike the full-wave control system, the period of current flow in the armature coils is varied according to the number of phases $n$ with the result that the range of available propulsive and levitative forces is different from that in the case of the full-wave control system, although the fact remains unchanged that a given desired positive or negative propulsive and levitative forces are generated by appropriately varying the leading angle $\gamma$. As is easily understood from the drawing, the angles $\gamma_1$ and $\gamma_2$ where the average levitative force becomes zero are expressed respectively as $\gamma_1 = 180°/n - m/2$ and $\gamma_2 = 180° + 180°/n - m/2$. This indicates that levitative force is produced when the inequality below is satisfied.

$$(180°/n - m/2) < \gamma < (180° + 180°/n - m/2) \quad (4)$$

Under this condition, propulsive force is obtained which is variable between positive and negative levels and becomes zero when $\gamma = (90° + 180°/n - m/2)$. It will be thus noted that the vehicle can be supplied with both levitative and propulsive forces at the same time by appropriately selecting the leading angle $\gamma$.

The overlapping angle $u$ to which no special reference is made above occurs inevitably when switching the thyristors. The inequalities (3) and (4) above must be replaced respectively with the alternatives below in the presence of such overlapping angle $u$.

$$(90° - m/2 + u/2) < \gamma < (270° - m/2 + u/2) \quad (5)$$

for the full-wave control system, and $$(180°/n - m/2 + u/2) < \gamma < (180° + 180°/n - m/2 + u/2) \quad (6)$$

for the full-wave control system. A study of above formula (5), (6) shows that current is always allowed to flow in 180° range in the full-wave control system, which corresponds to the half-wave control system involving two phases. Such a relation may be collectively expressed as $$(180°/x - m/2 + u/2) < \gamma < (180° + 180°/n - m/2 + u/2) \quad (7)$$

where $x$ is 2 if current in the armature coils is controlled by the full-wave control system, while $x$ is $n$ if it is controlled by the half-wave control system.

Figure 11:
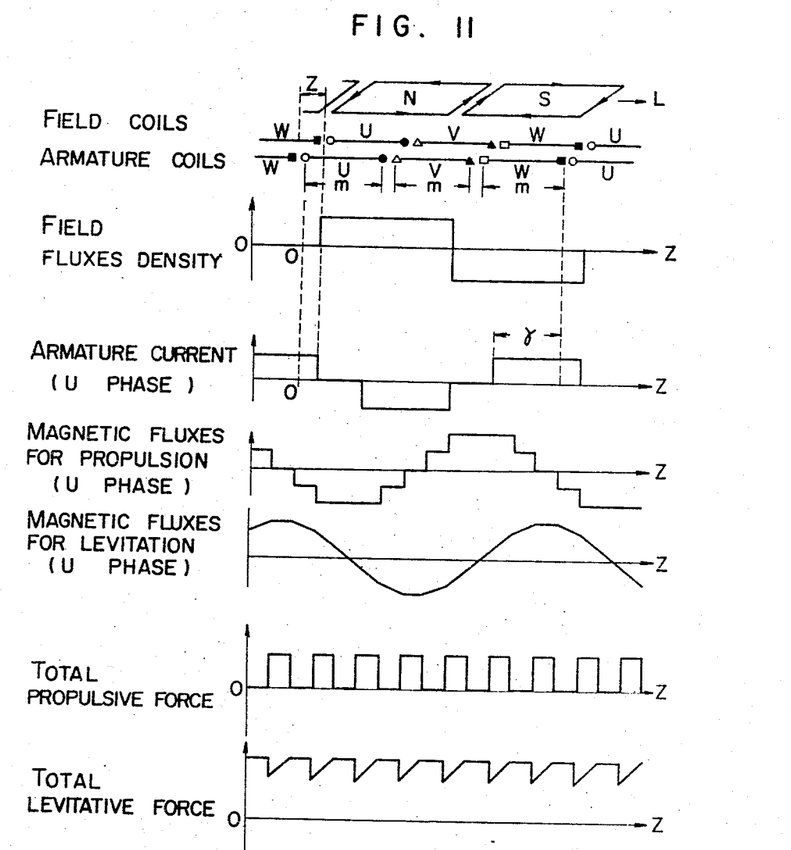
FIG. 11 is a diagram for explaining the operation of the linear synchronous motor according to the invention employing the armature coils of distributed winding.

The diagrams of FIG. 11 show waveforms of propulsive and levitative forces derived in a case where the leading angle of 90° is involved in the armature coils of distributed winding each 30° displaced and current flowing in which is controlled by the half-wave control system. This makes possible a more gentle curve of magnetic fluxes affecting the propulsive and levitative forces than when the armature coils of concentrated winding are employed, and therefore there occur less pulsations of propulsive and levitative forces. This is a very importance advantage to the linear synchronous motor used for high-speed vehicles.

Figure 12:
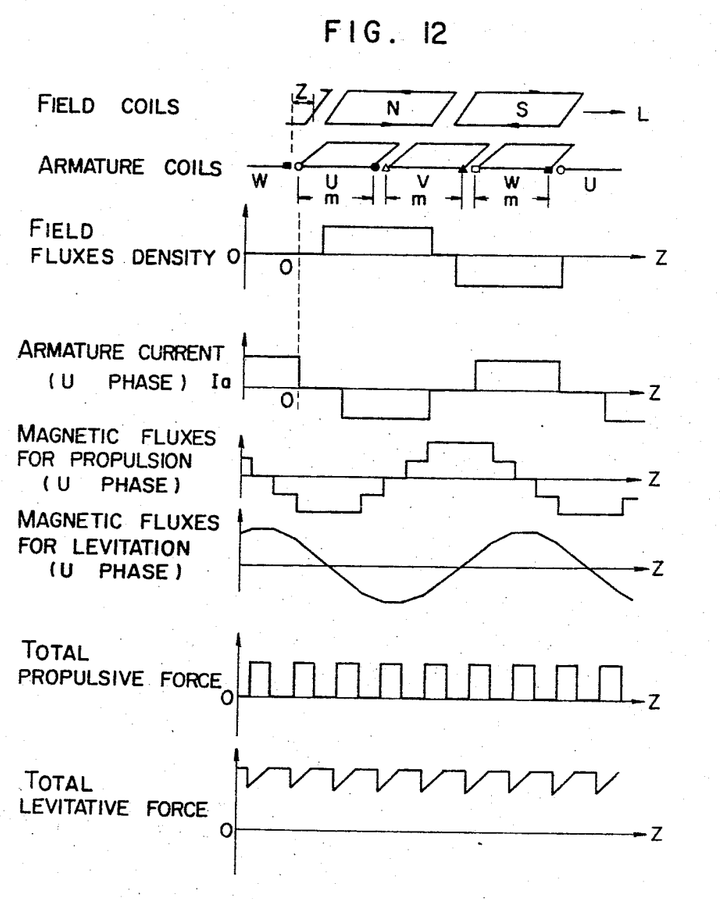
FIG. 12 is a diagram for explaining the operation of the linear synchronous motor according to the invention with its field coils shorter than the pole pitch.

The diagrams of FIG. 12 shows a case in which the length of the field coils is made shorter than the pole pitch. In this case, for substantially the same reason as in the case of FIG. 11, it is possible to reduce the pulsations.

Figure 13:
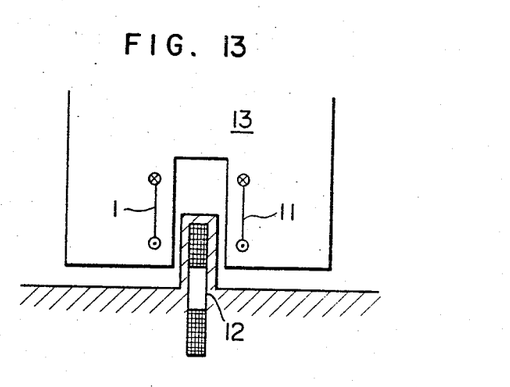
FIGS. 13 and 14 show longitudinal and cross sectional views respectively of the linear synchronous motor for high-speed vehicles according to another embodiment of the invention.
Figure 14:
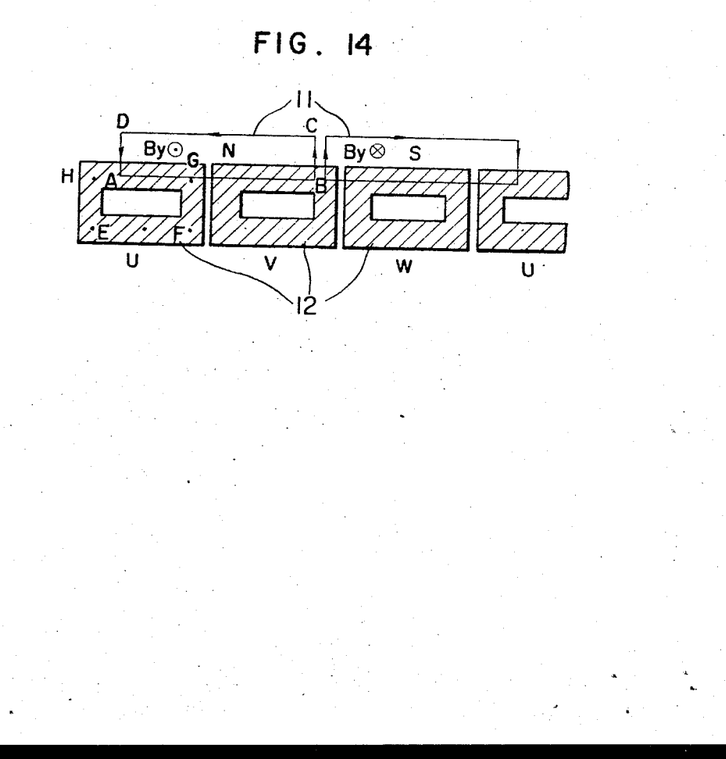

Longitudinal and cross sectional views of the linear synchronous motor for high-speed vehicles according to still another embodiment of the invention are shown in FIGS. 13 and 14. This embodiment is so constructed that field coils 11 on both sides of the vehicle "sandwich" the armature coils 12 at the center. The direction of the field magnetic fluxes is limited to the transverse component $By'$. Levitative force is derived from $K_3By'Ia'$ ($K_3$ being a positional function) which is the product of the component $By'$ and armature current $Ia'$ flowing along the portion HG of the armature coils in the direction of travel of the vehicle, while propulsive force is obtained from the product of component $By'$ and the armature current $Ia'$ flowing in the coil portions GF and HE perpendicular to the direction of travel of vehicle, that is to say, $K_4By'Ia'$ ($K_4$ being a positional function). The reason why the portion HG of armature coils is positioned at the same height as the portion AB of the field coils is that the levitative force is increased to lift the vehicle 13 when it is lowered thereby to obtain the stable levitation characteristics. In the embodiment under consideration, too, effective levitative force and propulsive force are obtained by controlling the leading angle $\gamma$ as in the preceding embodiment.

Figure 15:
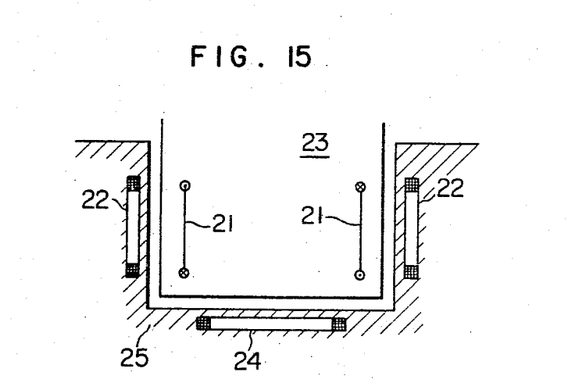
FIG. 15 is a diagram showing a longitudinal sectional view of the linear synchronous motor for high-speed vehicles according to still another embodiment of the invention.

Still another embodiment of the invention is illustrated in FIG. 15. According to this embodiment, the field coils 21 of superconductive materials are arranged on both lower sides of the vehicle 23 opposedly to the armature coils 22 disposed on the ground 25. In this arrangement, not only the propulsive force but the stabilizing force pressing the vehicle 23 toward its center are derived by regulating the leading angle $\gamma$. In addition to the armature coils 22, there is provided on the ground 25 the ground coils 24 under the vehicle for magnetic levitation of the vehicle.

The above-mentioned embodiments show some examples of arrangement of the field coils and armature coils, and it is clear that various other modifications of such arrangements are possible.

As can be seen from the above description, the present invention is characterized in that in arranging field coils on the vehicle opposedly to the armature coils on the ground, the leading angle $\gamma$ at the time of starting current flow of the armature coils is selected within the range $$(180°/x - m/2 + u/2) < \gamma < (180° + 180°/x - m/2 + u/2)$$

where $n$ is the number of phases of the armature coils, $m$ is the length of the armature coils, $u$ is an overlapping angle thereof and $x$ is 2 or $n$ respectively depending on whether current in the armature coils is controlled by the full-wave control or half-wave control system; that the leading angle $\gamma$ is made variable thereby to obtain not only the levitative force or stabilization force but variable positive or negative propulsive force at the same time; that the armature coils consist of distributed winding; that the pitch of the field coils is made shorter than the pole pitch; and that the armature coils are wound in a single layer at the pitch of 120°. Thus it is possible to obtain effective propulsive force and levitative force or stabilization at the same time with little pulsation of levitative force. Also, the propulsive force which is variable both positively and negatively is achieved by changing the leading angle appropriately while maintaining the levitative force constant, so that a high-speed vehicle can be operated controllably by regulating the leading angle $\gamma$.

What we claim is:

1. A commutatorless linear synchronous motor for high-speed vehicles comprising field coils mounted on the vehicles, armature coils laid on the ground oppositely to said field coils, and means for supplying electric power to said armature coils such that both the propulsion and levitation forces are simultaneously generated for the vehicle by the cooperation of said field coils and said armature coils, said supply means controlling the phase of the armature current flowing in the armature coils such that the armature current rises up when an electrical angle $\gamma$ for said armature coils is in the range expressed by the inequality $$(180°/x - m/2 + u/2) < \gamma < (180° + 180°/x - m/2 + u/2)$$

where $n$ is the number of phases of said armature coils, $m$ the length of the armature coils, $u$ the overlapping angle, and $x$ is 2 or $n$ depending on whether the current in said armature coils is regulated by the full-wave control system or the half-wave control system, respectively.

2. A commutatorless linear synchronous motor according to claim 1, wherein said supply means serves for varying the leading angle $\gamma$ for providing both levitative force or stabilization force and positively and negatively variable propulsive force.

3. A commutatorless linear synchronous motor according to claim 1, wherein said armature coils consist of distributed windings.

4. A commutatorless linear synchronous motor according to claim 1, wherein the length of said field coils is shorter than the pole pitch.

5. A commutatorless linear synchronous motor according to claim 1, wherein said armature coils are wound in a single layer at a pitch of 120°.

6. A commutatorless linear synchronous motor for high-speed vehicles comprising:
   a. field coils mounted on the vehicle so as to produce alternately opposite magnetic fields,
   b. polyphase armature coils laid on the ground oppositely to said field coils along the track of the vehicle in phase sequence, and
   c. converter means which apply A.C. electric power to said polyphase armature coils so that both propulsion and levitation forces are simultaneously given to the vehicle by the cooperation of said field coils and said polyphase armature coils, the armature current flowing in each phase of said polyphase armature coils being controlled by said converter means such that the armature current flowing in one armature coil of said armature coils rises up when the electrical angle $\gamma$ corresponding to the distance between a coil side of the armature coil of said armature coils lateral to the direction of the vehicle track and a coil side of one approaching field coil of said field coils lateral to the direction of the vehicle track, falls in the range expressed by the following inequality $$(180°/x - m/2 + u/2) < \gamma < (180° + 180°/x - m/2 + u/2)$$

where $n$ is the number of phases of said armature coils, $m$ the length of the armature coils, $u$ the overlapping angle, and $x$ is 2 or $n$ depending on whether the current in said armature coils is regulated by the full-wave control system or the half-wave control system, respectively.

* * * * *